(12) United States Patent
Glover

(10) Patent No.: US 7,215,977 B2
(45) Date of Patent: May 8, 2007

(54) ALL-IN-ONE MODULAR WIRELESS DEVICE

(75) Inventor: Kenneth Matthew Glover, Coppell, TX (US)

(73) Assignee: Enfora, L.P., Plano, TX (US)

(*) Notice: Subject to any disclaimer, the term of this patent is extended or adjusted under 35 U.S.C. 154(b) by 810 days.

(21) Appl. No.: 10/008,004

(22) Filed: Nov. 13, 2001

(65) Prior Publication Data

US 2003/0054856 A1 Mar. 20, 2003

Related U.S. Application Data

(60) Provisional application No. 60/323,346, filed on Sep. 19, 2001.

(51) Int. Cl.
*H04M 1/00* (2006.01)

(52) U.S. Cl. .................. 455/556.1; 455/556.2; 455/557

(58) Field of Classification Search .......... 455/556.1, 455/556.2, 557, 558, 73, 456.1, 456.6, 344, 455/575.1, 575.5, 566; 439/131, 638, 946
See application file for complete search history.

(56) References Cited

U.S. PATENT DOCUMENTS 5,218,188 A * 6/1993 Hanson .................. 235/375
5,566,226 A * 10/1996 Mizoguchi et al. ......... 455/558
5,606,732 A * 2/1997 Vignone, Sr. .............. 455/269
5,673,054 A * 9/1997 Hama ....................... 343/744
5,768,163 A * 6/1998 Smith, II ................... 708/105
5,809,115 A * 9/1998 Inkinen ................. 379/93.05
6,133,886 A * 10/2000 Fariello et al. ............ 343/702
6,168,331 B1 * 1/2001 Vann ....................... 400/472
6,203,378 B1 * 3/2001 Shobara et al. ........... 439/638
6,217,351 B1 * 4/2001 Fung et al. ................ 439/131
6,225,944 B1 * 5/2001 Hayes ................... 342/357.1
6,282,177 B1 * 8/2001 Ostermiller et al. ....... 370/278
6,327,154 B1 * 12/2001 Gauld et al. ............... 361/737
6,332,024 B1 * 12/2001 Inoue et al. ........... 379/433.06
6,516,202 B1 * 2/2003 Hawkins et al. ......... 455/556.2
6,570,767 B1 * 5/2003 Vapaakoski et al. ........ 361/737
6,697,415 B1 * 2/2004 Mahany .................... 375/130

FOREIGN PATENT DOCUMENTS

| WO | WO 00/36757 | 6/2000 |
|---|---|---|
| WO | WO 00/67261 | 11/2000 |
| WO | WO 01/82526 A2 | 11/2001 |
| WO | WO 01/86640 A2 | 11/2001 |
| WO | WO 02/21707 A2 | 3/2002 |

* cited by examiner

*Primary Examiner*—Sonny Trinh

(57) ABSTRACT

The present invention provides a modular designed CompactFlash interface for voice and data applications. The present invention provides the advantages of attachments, such as a keypad, that attach to a PDA and give the PDA the ability to provide a wireless voice handset. Other attachments include a small screen attachment that gives pager/PDA-like interfaces for data transmission and/or retrieval.

4 Claims, 2 Drawing Sheets

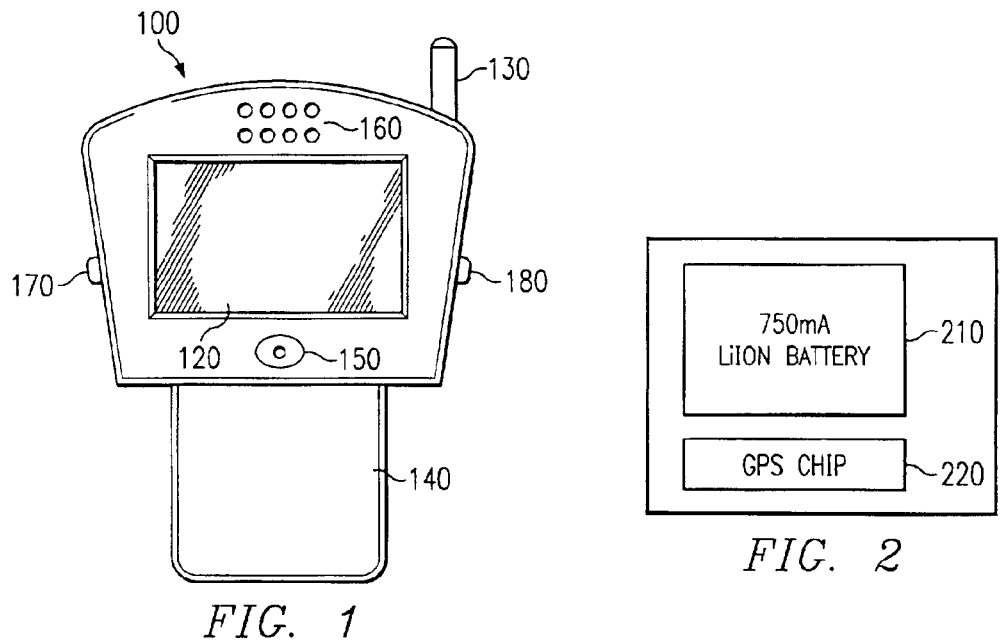
FIG. 1
FIG. 2
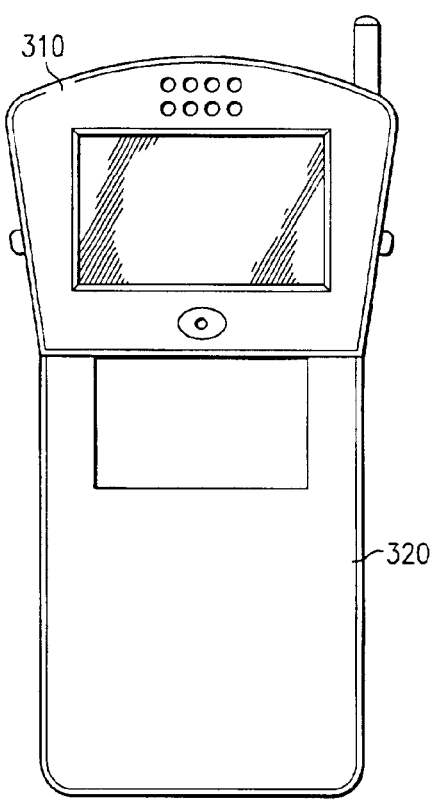
FIG. 3

ALL-IN-ONE MODULAR WIRELESS DEVICE

This application claims the benefit of U.S. Provisional Application No. 60/323,346, filed Sep. 19, 2001.

RELATED APPLICATIONS

The invention claims priority from commonly assigned U.S. Provisional Patent Application No. 60/323,346 by Kenneth Glover, filed on Sep. 19, 2001, and entitled All-In-One Modular Wireless Device. The invention also claims priority from commonly assigned U.S. patent application Ser. No. 09/552,321 by Weinzierl, et. al, filed on Apr. 19, 2000, and entitled CELLULAR DIGITAL PACKET DATA (CDPD) PUSH TECHNOLOGY MODULE.

TECHNICAL FIELD OF THE INVENTION

The present invention relates to wireless networks, and more particularly to wireless networks that provide both data and voice services. More particularly still, the invention relates to enhancements for a CompactFlash-based core module that enables data and voice communication with a wireless network.

BACKGROUND OF THE INVENTION

Personal Digital Assistants

The market for handheld computing devices (also called Personal Digital Assistants, or PDAs) has evolved from the ill-fated Newton MessagePad™ to other very successful handheld device platforms. Further evidence of continued success is seen in that independent market research firms expect the sales of handheld devices to continue to double each year between the years 1999 and 2003. Many PDAs have ports that adhere to a Compact-Flash™ standard.

The Compact-Flash™ standard utilizes a fifty pin format and a passive sleeve connection to provide an ability to connect devices and memory through a relatively small connection. Furthermore, the Compact-Flash standard also supports its predecessor, the PC card format. The success of the Compact-Flash standard is evidenced by the fact that there are numerous digital cameras, handheld PC's, as well as other electronic platforms that utilize Compact-Flash enabled ports (memory storage devices, modems, Ethernet cards, integrate with the Compact-Flash standard).

Wireless Connections

Wireless data availability has grown in concert with the handheld device market. Current trends in wireless data availability include the integration of voice and data capabilities into a single handheld device platform, such as "smart phones." Though powerful, a single voice and data handheld device often provides more functionality than is needed by a user, and are often quite expensive.

Wireless Application Protocol (WAP) is deployed among several carriers through various technologies in North America, and almost all of the major phone vendors have implemented WAP browser technology on some of their handsets. In addition, many international carriers are implementing WAP as well. This is because the WAP browser (also known as a micro-browser) is very efficient and, thus, may be provided with low cost rate plans (lower than typical packet data rate plans offered for regular Internet access).

A device that uses WAP as a platform provides an array of features that enhance a user's experience. Features like "push" capabilities, alerting, security, data compression, message transmission status information, and graphics support, are some of the features provided in the WAP architecture. For a developer, the WAP development environment addresses many of the hardware dependent factors such as screen size, graphic's display, cache management, and data input which enable the developer to focus on application design and development. Furthermore, WAP platforms provide features which are not inherent to current Cellular Digital Packet Data (CDPD) networks, such as "store and forward" capabilities.

Accordingly, devices have been designed to bring WAP and voice capabilities to portable computers, such as PDAs. Some devices, such as those disclosed in U.S. patent application Ser. No. 09/552,321, entitled "CELLULAR DIGITAL PACKET DATA (CDPD) PUSH TECHNOLOGY MODULE", by Weinzierl, et. al, and which is incorporated by reference herein in its entirety, address the need for a single platform capable of integrating a wireless network with a PDA device that has a Compact-Flash interface. Other devices addressed in the aforementioned U.S. Patent Application address the need for a Compact-Flash enabled device that provides the ability to place data on and retrieve data from a wireless network in a Compact-Flash size data entry module.

However, no one has addressed providing data entry and retrieval functionality to these and similar devices separate and apart from laptop computers, PDAs, and other "intelligent" portable computing platforms. Accordingly, there exist the need for data and voice entry devices, as well as data and voice retrieval devices that enable a CompactFlash core module to provide independent voice and data use in a wireless network. The invention enables the user to carry small attachments that can turn a CompactFlash core module into a wireless phone or a two-way data access device.

SUMMARY OF THE INVENTION

The present invention provides technical advantages as a module, based on the CompactFlash interface, for combined voice and data applications. The solution provides attachments like a small keypad that attaches and creates a wireless voice handset and a small screen attachment that provides pager/PDA-like interfaces for data transmission and/or retrieval. The device can also be attached to a PC Card converter to provide PC Card support for additional applications as well as standard CF applications.

The present invention is a modular designed Compact-Flash interface for voice and data applications. The present invention provides the advantages of attachments, such as a keypad, that attach to a PDA and give the PDA the ability to provide a wireless voice handset. Other attachments include a small screen attachment that gives pager/PDA-like interfaces for data transmission and/or retrieval.

The solution provides other various attachment options based on the CompactFlash (CF) interface specification for wireless voice and data options. The CF format also allows the device to be used as a PC Card or CF device in various existing configurations. Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following DETAILED DESCRIPTION. To better understand the invention, the DETAILED DESCRIPTION should be read in conjunction with the drawings in which:

FIG. 1 displays the core device;

FIG. 2 demonstrates the potential use of a battery pack that could integrate a GPS receiver;

FIG. 3 demonstrates the core module being used in a PC Card adapter;

DETAILED DESCRIPTION

Figure 4:
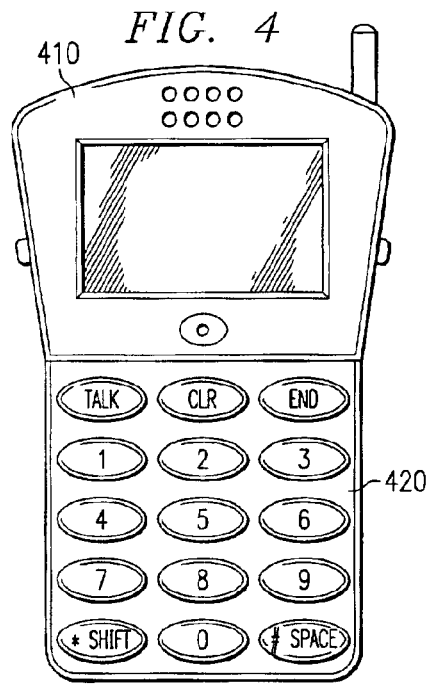
FIG. 4 demonstrates the use of the core module with a phone keypad attachment.

The present invention provides technical advantages as a module, based on the CompactFlash (CF) interface, for combined voice and data applications. The solution provides attachments, such as keypads and small screen attachments that creates wireless voice handsets and provide pager/PDA-like interfaces for data transmission and reception. The device is also preferably enabled to attach to a PC Card converter.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts maybe used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act maybe used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act or an equivalent function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising", for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning" or "step for—functioning" in the claims section.

FIG. 1 displays a core device module 100 with an integrated microphone, speaker, and power interfaces. The core device module 100 generally comprises a display 120 and a radio frequency (RF) antenna 130. The core device module 100 is configured to support a CompactFlash interface 140. The core device module 100 also provides some data entry and command features. For example, a microphone 150 may be used to receive audible sound, which is then transmitted to a wireless network via the antenna 130. In addition, a speaker 160 is used to provide audible sound to a person who is using the core device module 100. Likewise, a headsetjack 170 is provided in the core device module 100 so that a user may use :hands-free" headset devices to listen to voice or other sound received by the core device module 100. Furthermore, a powerjack 180 in the core device module 100 includes one way power that may be provided to the core device module 100. Alternatively, a battery (not shown), or other power source may be used to power the core device module 100. Similarly, FIG. 2 demonstrates the potential use of a battery pack 210. In the preferred embodiment, the battery pack includes an integrated GPS receiver 220.

Although the antenna 130 is shown as being an external antenna, it should be understood that the antenna may be located completely within the core device module 100. Also, although the power jack 180, speaker 160, headset jack 170, and microphone 150 are shown in specific locations on the core device module 100, the invention should not be so limited. Accordingly, any of the aforementioned features may be relocated at any position on the core device module 100.

Similarly, although in FIG. 1 the Compact-Flash interface is shown as a male Type I Compact-Flash interface (Type I being the thinnest form of Compact-Flash interface). It should be understood that other types of Compact-Flash interfaces may be utilized. Accordingly, the thicker Type II or Type III Compact-Flash interfaces may be provided for core device module 100 integration with an information entry device. Further, additional functionality may be provided to the core device module 100 by incorporating a processor and memory (not shown) in the core device module 100, the processor and memory being integrated with a transceiver for sending and receiving communication with a wireless network.

FIG. 3 demonstrates the core device module 310 being used in a PC Card adapter 320. The PC card adapter 320 allows the core device module 310 to be integrated with a standard PC, or portable PC, and to thus provide the PC/portable PC the ability to communicate with a voice or data wireless system.

FIG. 4 demonstrates the use of the core device module 410 with a phone-type keypad attachment 420. This, of course, allows the device to be used as a wireless handset. The phone-type keypad attachment 420 is preferably about the size of the core device module 410, and has a female Compact-Flash port connection for accepting a Compact-Flash connection from the core device module 410. Of course, if the core device module 410 has a female-type CF port, then the phone-type keypad attachment 420 will have a male CF port attachment. In a preferred embodiment, the phone-type keypad attachment 420 produces the tones needed to communicate with a wireless or land-based telecommunications network 20. Furthermore, the phone-type keypad attachment is preferably capable of connecting a user with the Internet.

Figure 5:
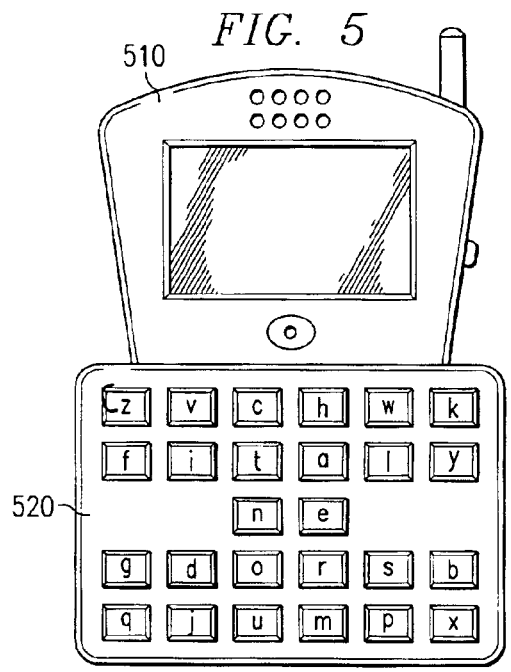
FIG. 5 demonstrates the core module attached to a keyboard device.

FIG. 5 demonstrates the core device module 510 attached to a keyboard device 520. This allows the core device module 510 to be used for text messaging. The keyboard device 520 is approximately the size of the core device module 510 and has a female Compact-Flash port connection for accepting a Compact-Flash connection from the core device module 510. Furthermore, in a preferred embodiment the keyboard device 520 utilizes a first door and a second door so that the keyboard device 520 may be about the size of the core device module 510, and then allow the keyboard device 520 to fold-out so that the keys may be of a more ergonomic size. The use of doors may also provide protection for the keys when the doors are shut. In one embodiment, the keyboard device uses a FITALY keyboard. Of course, different keyboard formats maybe used and various keys may be utilized to provide specific functionality such as one touch hot keys. Preferably the keyboard device is capable of connecting a user with the Internet.

Figure 6:
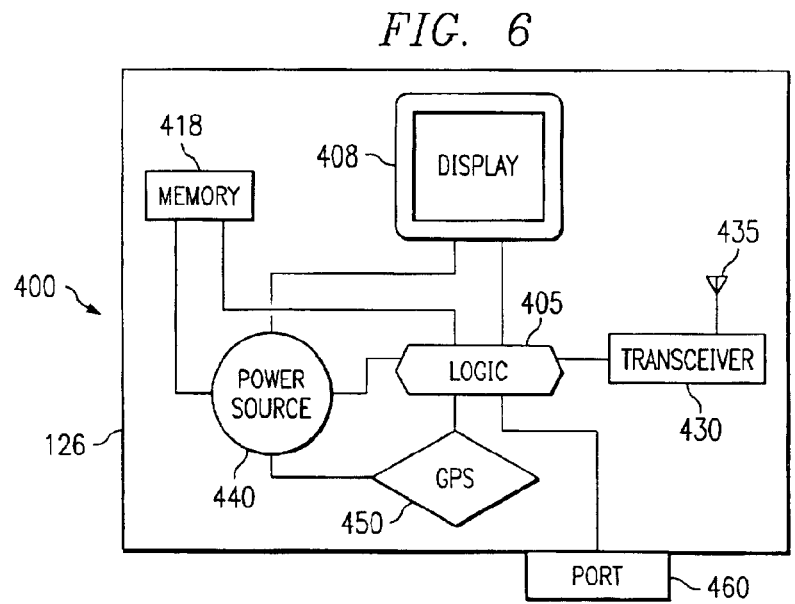
FIG. 6 illustrates a block diagram of a PDA module system.

FIG. 6 illustrates a block diagram of a PDA module system 400. As illustrated, most of the PDA subsystems that constitute the PDA module system 400 are maintained within a casing. A PDA module system 400 has several PDA module subsystems which are generally illustrated in FIG. 6 as various shaped polygons. Included in the PDA module system 400 is a means for controlling a module 405, which is typically a logic device, such as a digital signal processor (DSP), a computer processor, or a printed circuit board (PCB), for example. Coupled to the means for controlling a module 405 is a means for displaying 408. The means for displaying 408 is usually a electronically enabled display, such as a LCD, but may be another visual apparatus used to provide visual information to a user.

Also coupled to the means for controlling 405 is a computer readable medium 418, such as memory. The computer readable medium includes passive/semi-permanent data storage, such as random access memory (RAM), as well as permanent data storage, such as read only memory (ROM). Thus, the computer readable medium 418 stores a program algorithm needed to process cellular digital packed data (CDPD) based electronic communication by the PDA module system 400, such as an email processing and preview algorithm.

It may be desirable for the PDA module system 400 to communicate remotely with another device. To enable remote communication for the PDA module system 400, a means for transmission 430 is preferably provided in the PDA module system 400. The means for transmission 430 is typically a transmission device, such as a receiver (which provides one way communication), or a transceiver (when two way communication is desired), for example. In addition, to enable remote communication via the means of transmission 430, an internal antenna 435 is incorporated into the PDA module system 400.

Furthermore, it may also be desirable to provide localized power for the PDA module system 400. Accordingly, a power source 440, such as a battery, for example, is built into the PDA module system 400.

Additional PDA subsystems may be provided in order to generate additional functionality for the PDA module system 400. Accordingly, a global positioning system (GPS) 450 communicates with the means for controlling 405 so that the location of the PDA module system 400 may be integrated with other data to provide additional user functionality to the PDA module system 400.

Coupled to the means for controlling 405 is a means for communicating 460. The means for communicating 460 is preferably a port compatible port, such as a Compactflash-type card port, but may be any port that is electrically compatible with a PDA.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A method for communicating via a wireless module, comprising:

attaching a device to a first wireless module;

receiving a signal from the attached device;

transmitting the signal from the first wireless module;

receiving the transmitted signal at a second wireless module;

communicating between the device and the second wireless module via the first wireless module;

communicating with a data network by the device and the first wireless module;

utilizing information in the data network; and communicating with the second wireless module by the device and the first wireless module utilizing the information in the data network.

2. The method of claim 1 comprising displaying a visual result on the first wireless module based on the communicating between the device, the data network, and the second wireless module.

3. The method of claim 1 comprising processing the received signal from the attached device by a program in the first wireless module.

4. The method of claim 3 comprising transmitting a signal from the first wireless module to the second wireless module based on the processing.

* * * * *